United States Patent [19]

Pietrantonio

[11] 4,161,819

[45] Jul. 24, 1979

[54] GLASS CUTTER

[76] Inventor: Frank Pietrantonio, 2215 Gunther Ave., Pelham Gardens, N.Y. 10469

[21] Appl. No.: 882,980

[22] Filed: Mar. 3, 1978

[51] Int. Cl.² .................... B26B 25/00; C03B 33/10
[52] U.S. Cl. ............................................. 30/164.95
[58] Field of Search ................ 30/164.95; 7/105, 165

[56] References Cited

U.S. PATENT DOCUMENTS

| | | | |
|---|---|---|---|
| 526,444 | 9/1894 | Heysinger | 30/164.95 |
| 742,179 | 10/1903 | Fletcher | 30/164.95 |
| 1,250,328 | 12/1917 | Langford | 7/165 |
| 3,392,445 | 7/1968 | Koran | 30/164.95 |

Primary Examiner—Jimmy C. Peters
Attorney, Agent, or Firm—Eisenman, Allsopp & Strack

[57] ABSTRACT

A hand-operated tool for cutting sheet glass; the tool including a flat plate which near one end supports a rotatable circular cutter blade for scribbing a scored line on a glass surface, a spherical knob at an opposite end of the plate serving as a hammerhead to strike at the glass on an opposite side of the scored line so to deepen the cut of the score, and the plate having a series of different width notches along one side edge for grasping one end of the glass and breaking it off about the scored line; the plate additionally including a storage compartment inside for storing extra circular cutter blades.

4 Claims, 10 Drawing Figures

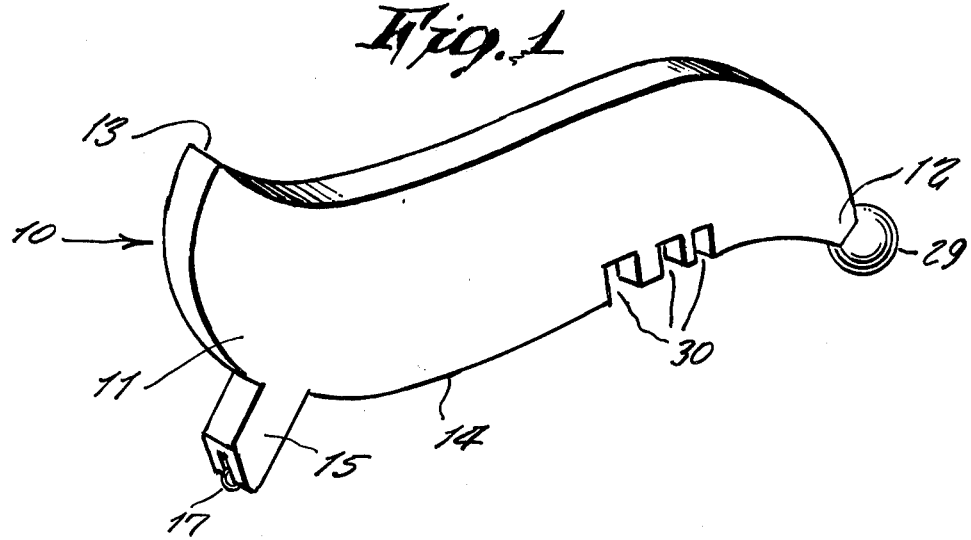
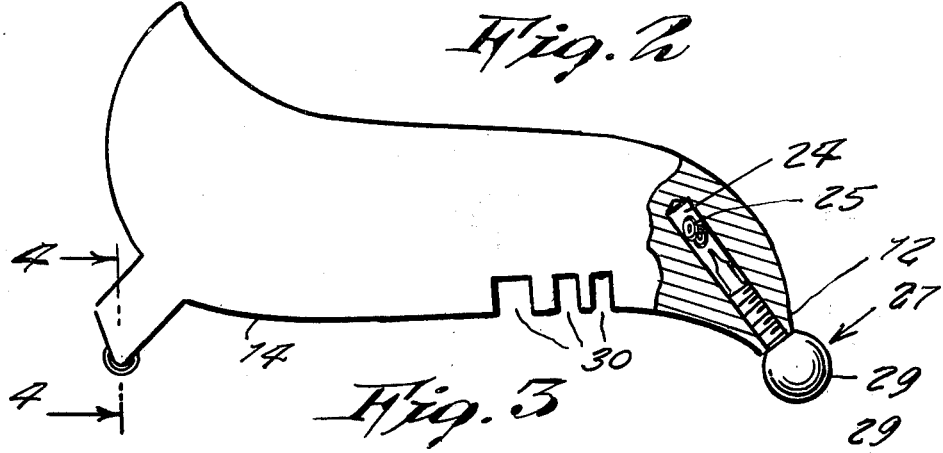
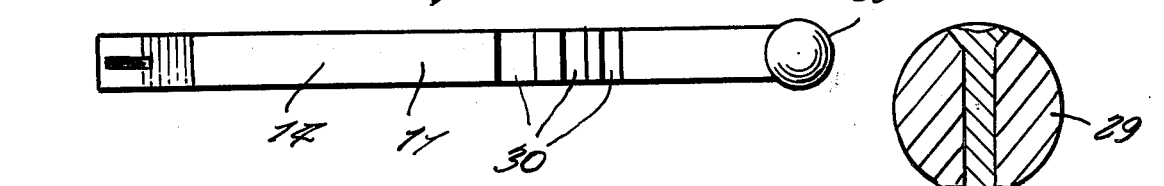
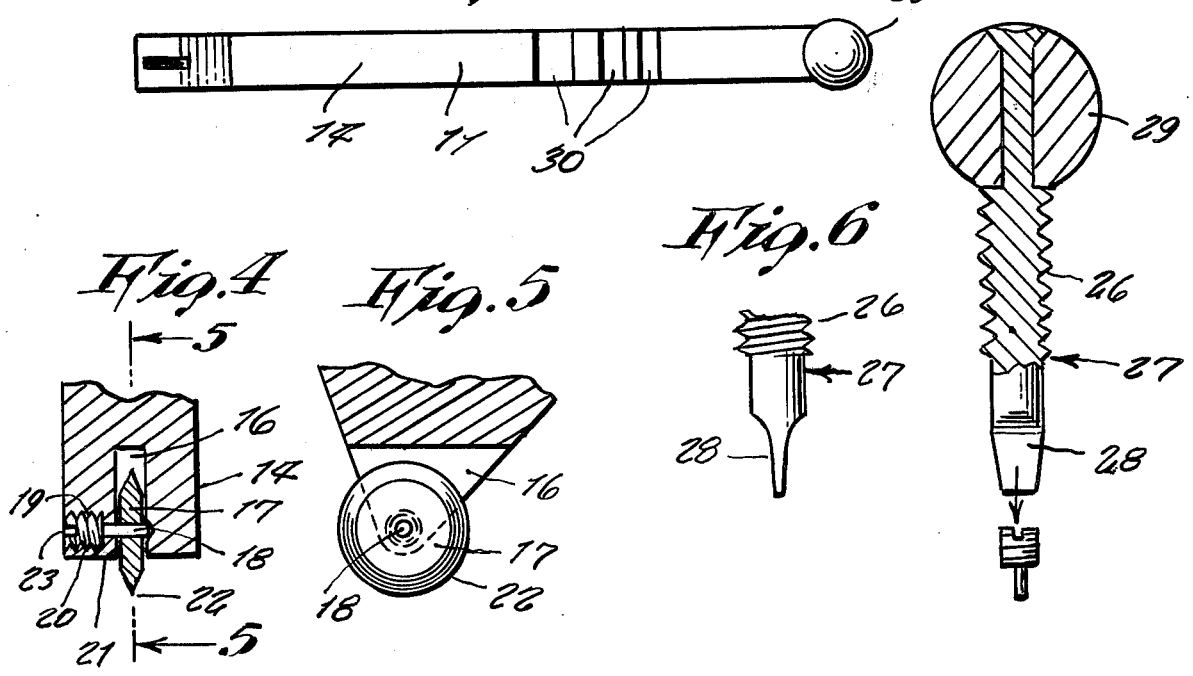

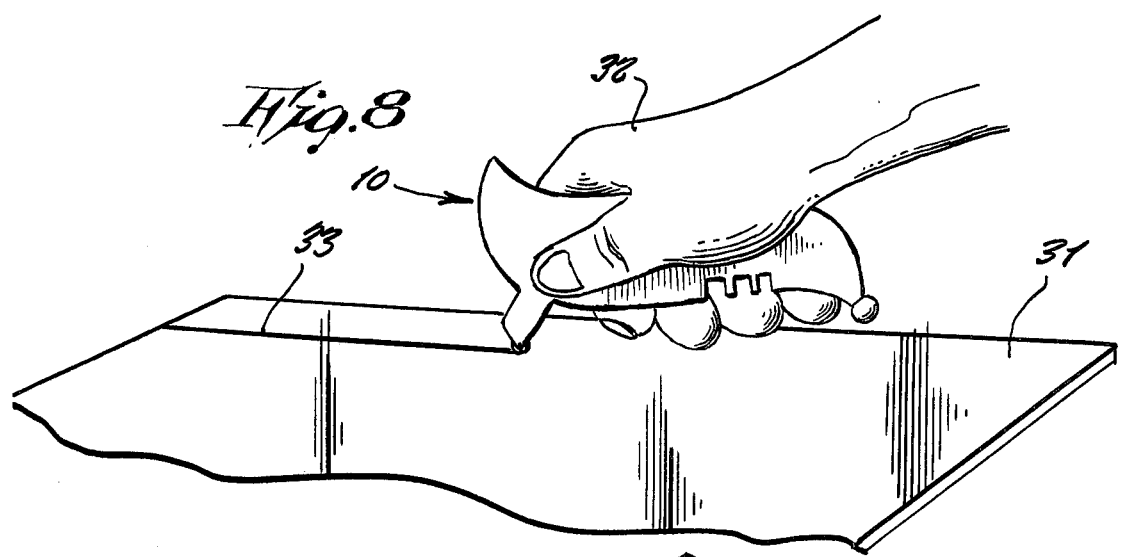
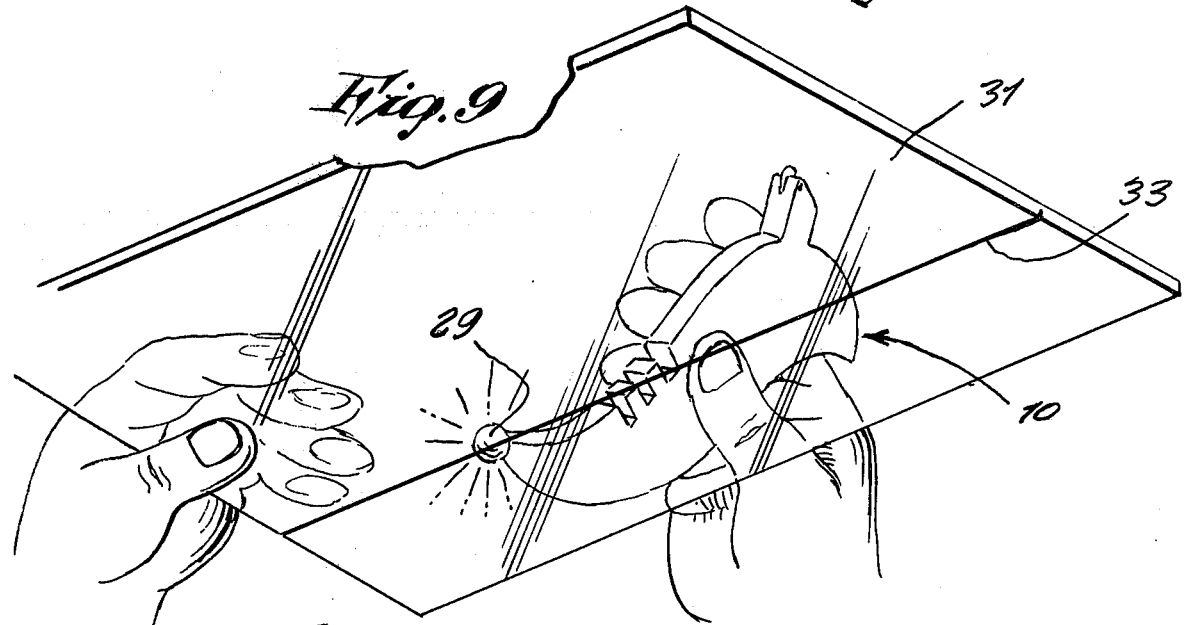
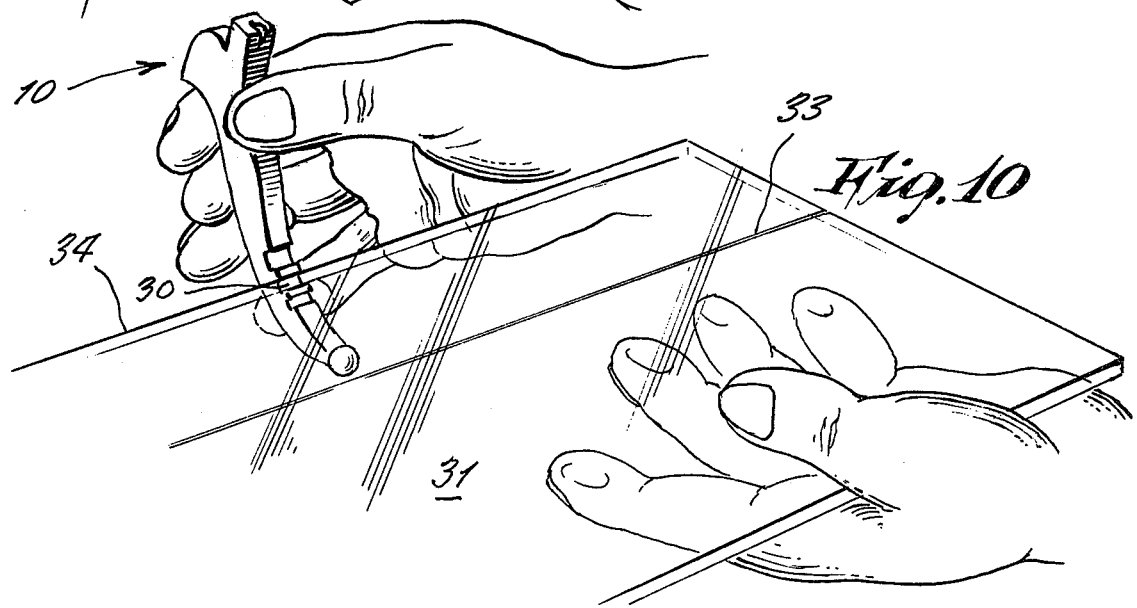

GLASS CUTTER

This invention relates generally to glass cutters.

A principal object of the present invention is to provide a glass cutter which is designed for being comfortably held in a hand so that a sheet of glass can be quickly and readily cut in an accurate manner.

Another object is to provide a glass cutter that is safer to handle so to not get cut by the glass.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the glass cutter invention.

FIG. 2 is a side view thereof shown partly in cross section.

FIG. 3 is a bottom edge view.

FIG. 4 is an enlarged cross section on line 4—4 of FIG. 2.

FIG. 5 is a cross section on line 5—5 of FIG. 4.

FIG. 6 is an enlarged fragmentary view of the screw driver.

FIG. 7 is a view of the screw driver shown partly in cross section.

FIG. 8 shows the tool in use cutting a glass.

FIG. 9 shows the tool tapping the scored glass.

FIG. 10 shows the tool breaking off the glass.

Referring now to the drawings in greater detail, the reference numeral 10 represents a glass cutter according to the present invention wherein there is a flat plate 11 which is oppositely curved at each end toward tapered points 12 and 13.

Along one side edge 14 of the plate there is a sidewardly inclined extension or foot 15 which at its terminal end has a slot 16 in which a circular cutter blade 17 is placed and is supported rotatably free on a pin 18 which bridges the slot. One end of the pin has a screw thread 19 which is engaged in a threaded opening 20 in one side toe 21 of the foot. The circular cutting edge 22 of the blade protrudes outwardly of the slot so to be able to be used.

When the cutter blade becomes dulled from repeated use, it can be removed and replaced by a fresh cutter blade. In order to remove the worn blade, a screw driver slot 23 on an exposed end of the pin can be engaged by a screw driver so that the pin can be rotated in order to be withdrawn from the slot, and thus allows the worn cutter blade to fall out.

A deep hole 24 is drilled in the plate at the tapered point 12 so to form a storage space for extra, new cutter blades 25 for replacing the worn blade 17. The hole is screw threaded so that a screw driver 27 is engageable therein, in order to store the screw driver in the hole when not needed, and which also serves as a screw cap to close the hole and retain the cutter blades 25 therein. The inward end of the screw driver shank is flattened so to form a flat blade 28 that is engagable in the cross slot 23 on the end of the pin 18, when a cutter blade is being changed. The outward end of the screw driver shank has a large spherical ball or head 29 press fitted thereupon and rivoted over. The bead remains outside of the hole 24 so to serve as a convenient handle for rotating the screw driver when wishing to remove or replace the screw driver in the hole. The spherical ball serves as a hammerhead for tapping on a glass pane, as will be described hereafter.

The hammerhead, screw driver, cutter blades, pin and plate are all made of a metal that is suitable for their intented tasks.

Along a same side edge 14 of the plate there is a series of notches 30 each of which is a different width so as to be adaptable to receive different thicknesses of glass panes.

In operative use of the tool for cutting a glass pane 31, the tool is first held in a hand 32 as shown in FIG. 8 so that the cutter blade 17 can scribe a line 33 along a line of an intended break of the glass.

Thereafter, as shown in FIG. 9, the glass is tapped on a rear side from the scribed line, by tapping with the hammerhead along the line, so as to extend the scribed cut through the glass thickness.

Thereafter, an edge 34 of the glass is grasped in one of the notches 30 and the tool is then pivoted so that the pivoting force breaks the glass completely along the scribed line, as shown in FIG. 10.

Thus the tool easily and precisely cuts a glass as intended.

While certain novel features of this invention have been shown and described and are pointed out in the annexed claims, it will be understood that various ommissions, substitutions and changes in the forms and details of the device illustrated and in its operation can be made by those skilled in the art without departing from the spirit of the invention.

What is claimed is:

1. A glass cutter comprising an S-shaped handle having in its working position an upturned front end and a downturned back end to define concave gripping surfaces respectively on its top edge adjacent the front end and on its bottom edge adjacent the back end, a carrier foot extending downwardly from the lower edge of the handle at a point rearwardly of the front end and substantially beneath the concave upper gripping surface, and a cutting wheel disposed at the lower end of the depending carrier foot.

2. A glass cutter as set forth in claim 1, including a tapping ball detachably mounted at the back end of the handle forming a downwardly directed extension thereof to augment the concave gripping area at the lower rear edge of the handle, said tapping ball having a shank formed thereon and received in a cavity at the back end of the handle for holding spare cutting wheels.

3. A glass cutter as set forth in claim 2, said carrier foot being formed with a cutting wheel receiving slot on its lower end and a threaded mounting pin on which the wheel is rotatably mounted, the shank of said tapping ball being formed with a screwdriver tip dimensioned to operate the mounting pin for the cutting wheel.

4. A glass cutter as set forth in claim 3, including a plurality of glass-engaging notches of different widths formed on the lower edge of the handle at points generally forwardly of the concave gripping surface on the lower rear edge of the handle.

* * * * *